United States Patent [19]

Aoki et al.

[11] Patent Number: 5,754,032
[45] Date of Patent: May 19, 1998

[54] ALTERNATOR CONTROL SYSTEM

[75] Inventors: Takuya Aoki; Yuichi Shimasaki; Hiroaki Kato; Akihisa Saito, all of Wako, Japan

[73] Assignee: Honda Giken Kogyo Kabushiki Kaisha, Tokyo, Japan

[21] Appl. No.: 736,659

[22] Filed: Oct. 25, 1996

[30] Foreign Application Priority Data

Oct. 31, 1995 [JP] Japan .................................. 7-305225

[51] Int. Cl.$^6$ ...................................................... H02P 9/00
[52] U.S. Cl. .................................................. 322/28; 322/8
[58] Field of Search ................................................ 322/8, 28

[56] References Cited

U.S. PATENT DOCUMENTS

| | | | |
|---|---|---|---|
| 4,346,337 | 8/1982 | Watrous | 322/25 |
| 4,985,670 | 1/1991 | Kaneyuki et al. | 322/28 |
| 5,210,480 | 5/1993 | Iwatani et al. | 322/28 |
| 5,606,246 | 2/1997 | Adachi | 322/8 |

*Primary Examiner*—Thomas M. Dougherty
*Assistant Examiner*—Nicholas Ponomarenko
*Attorney, Agent, or Firm*—Nikaido Marmelstein Murray & Oram LLP

[57] ABSTRACT

A control system for controlling an alternator driven by an engine, for generating electric power, has a changeover switch for selectively switching destination of electric power generated by the alternator to a plurality of electric loads having respective different load voltage values. An ECU controls switching operation of the changeover switch and controls the alternator electric power, according to a direction in which the changeover switch has been switched. The ECU detects voltage of the alternator electric power when the destination of the alternator electric power is to be switched from a first electric load having a higher load voltage value of the plurality of electric loads to a second electric load having a lower load voltage value of the same, and causes the changeover switch to switch the destination of the alternator electric power from the first electric load to the second electric load after it is determined that the voltage of the alternator electric power has been changed from a predetermined higher voltage value to a predetermined lower voltage value.

4 Claims, 3 Drawing Sheets

1

ALTERNATOR CONTROL SYSTEM

BACKGROUND OF THE INVENTION

1. Field of the Invention

This invention relates to an alternator control system, and more particularly to an alternator control system of this kind, which has a changeover switch which selectively switches the destination of electric power generated by an alternator driven by an engine to a plurality of electric loads having different load voltage values, and a control device for controlling output voltage generated by the alternator depending on a direction in which the changeover switch has been switched.

2. Prior Art

A catalyzer employed in an internal combustion engine, for purifying exhaust gases emitted from the engine does not become activated until a considerable time period elapses after the start of the engine when the engine is started in a cold state. To accelerate the activation of the catalyzer, there is conventionally employed an electrically-heated catalyzer which is electrically heated to become promptly activated. Further, to accurately control electric power supplied to the electrically-heated catalyzer, a control method is known, for example, from Japanese Patent Application No. 7-120648 and U.S. Ser. No. 08/634,507 corresponding thereto, in which the electrically-heated catalyzer is supplied with electric power from an alternator of a vehicle in which the engine is installed, and an energization time period thereof is set according to a detected engine temperature or a like parameter. Then, the destination of electric power supplied from the alternator is switched from electrical equipment mounted on a chassis of the vehicle to the catalyzer by means of a changeover switch to energize the catalyzer over the set energization time period. On this occasion, voltage generated by the alternator is set to a higher value than a normal value, i.e. output voltage from a battery of the vehicle according to detected operating conditions of the engine so as to reduce current supplied to the electrically-heated catalyzer, to thereby minimize or reduce waste of energy and hence curtail costs involved in employing peripheral component parts of the electrically-heated catalyzer.

In the known control method, however, if a voltage output circuit of the alternator undergoes failure to hold the alternator in a high voltage-generating mode, high-voltage current to be supplied to the electrically-heated catalyzer flows through the electrical equipment, to thereby damage the same.

SUMMARY OF THE INVENTION

It is the object of the invention to provide an alternator control system, which is capable of preventing electrical equipment forming a lower-voltage electric load from being damaged due to high-voltage current supplied thereto when the destination of electric power generated by the alternator is to be switched from a higher-voltage electric load to the lower-voltage electric load out of a plurality of electric loads, even in the event that the voltage output circuit of the alternator undergoes failure to hold the alternator in a high voltage-generating mode.

To attain the above object, the present invention provides a control system for controlling an alternator driven by an engine, for generating electric power, comprising:

a changeover switch for selectively switching destination of electric power generated by the alternator to a plurality of electric loads having respective different load voltage values; and control means for controlling switching operation of the changeover switch and for controlling the electric power generated by the alternator, according to a direction in which the changeover switch has been switched;

the control means including voltage-detecting means for detecting voltage of the electric power generated by the alternator when the destination of electric power generated by the alternator is to be switched from a first electric load having a higher load voltage value of the plurality of electric loads to a second electric load having a lower load voltage value of the plurality of electric loads, and switching-enabling means for causing the changeover switch to switch the destination of the electric power generated by the alternator from the first electric load to the second electric load after the voltage-detecting means determines that the voltage of the electric power generated by the alternator has been changed from a predetermined higher voltage value to a predetermined lower voltage value.

Preferably, the control means includes abnormality-determining means for determining that the alternator is functioning abnormally, when the voltage of the electric power generated by the alternator maintains the predetermined higher voltage value when the destination of electric power generated by the alternator is to be switched from the first electric load to the second electric load.

In a preferred embodiment of the invention, there is provided a control system for controlling an alternator driven by an internal combustion engine, for generating electric power, the engine being installed in a vehicle having electrical equipment mounted on a chassis thereof, the engine having an exhaust system, and an electrically-heated catalyzer arranged in the exhaust system and connected to the alternator to be electrically heated by the electric power generated by the alternator, the control system comprising:

a changeover switch for selectively switching destination of electric power generated by the alternator to the electrically-heated catalyzer and the electrical equipment; and control means for controlling switching operation of the changeover switch and for controlling the electric power generated by the alternator, according to a direction in which the changeover switch has been switched;

the control means including voltage-detecting means for detecting voltage of the electric power generated by the alternator when the destination of electric power generated by the alternator is to be switched from the electrically-heated catalyzer to the electrical equipment, and switching-enabling means for causing the changeover switch to switch the destination of the electric power generated by the alternator from the electrically-heated catalyzer to the electrical equipment after the voltage-detecting means determines that the voltage of the electric power generated by the alternator has been changed from a predetermined higher voltage value to a predetermined lower voltage value.

Preferably, the destination of the electric power generated by the alternator is switched to the electrically-heated catalyzer by the changeover switch, the control means controls the voltage of the electric power generated by the alternator to a value larger than a value assumed when the destination of the electric power generated by the alternator is switched to the electrical equipment by the changeover switch.

DETAILED DESCRIPTION

The invention will now be described in detail with reference to the drawings showing an embodiment thereof.

Figure 1:
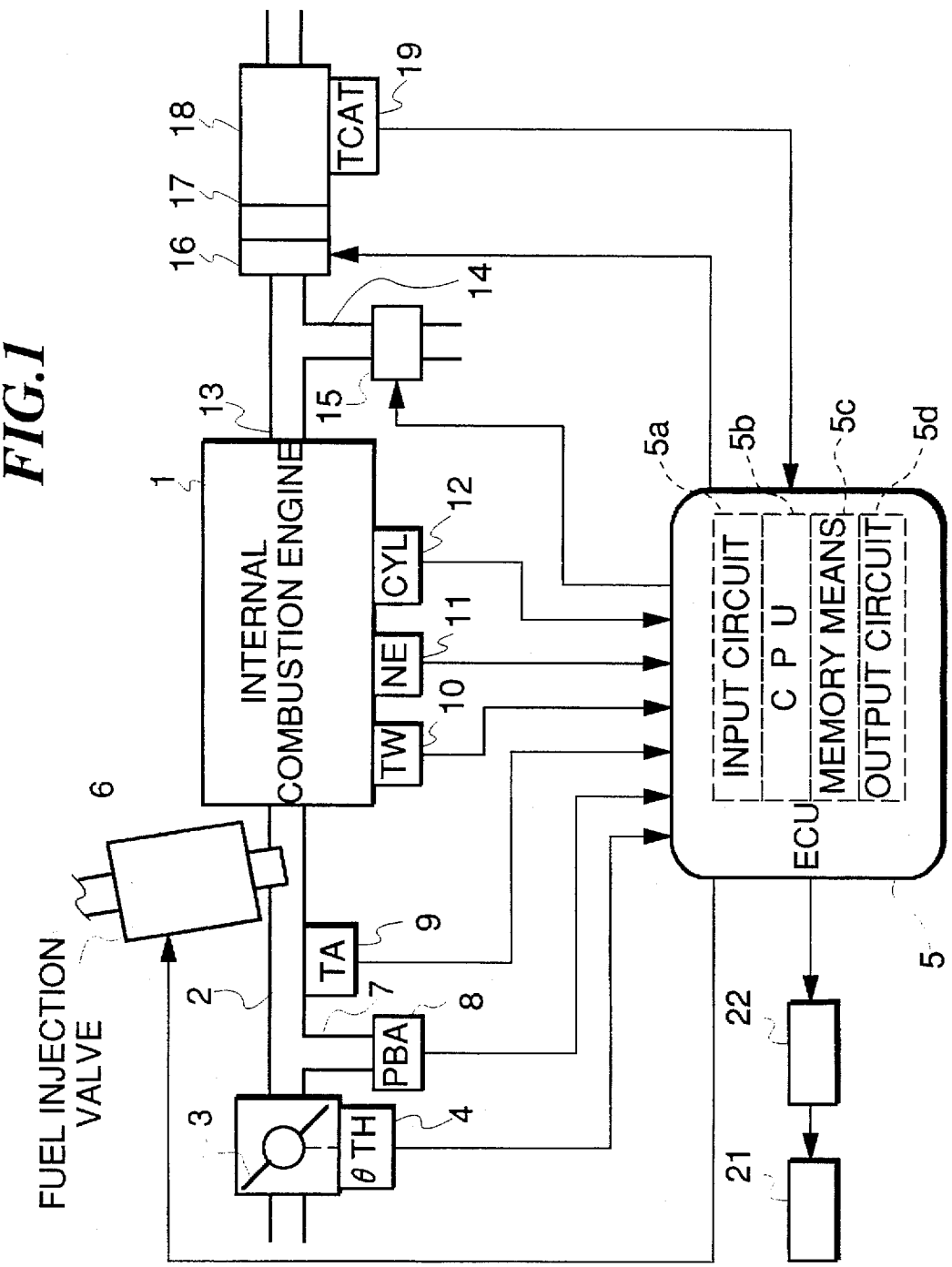
FIG. 1 is a block diagram schematically showing the whole arrangement of an internal combustion engine and an alternator control system therefor, according to an embodiment of the invention.

Referring first to FIG. 1, there is illustrated the whole arrangement of an internal combustion engine and an alternator control system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is electrically connected to the ECU 5 via a regulator 22 such that voltage generated by the alternator 21 is controlled by a signal from the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, regulator 22, etc., for driving the same.

The CPU 5b calculates an energization time period TON of the EHC 16 and voltage VEHC supplied thereto in response to the output signals from the TW and TA sensors, to generate control signals based on results of the calculations.

Figure 2:
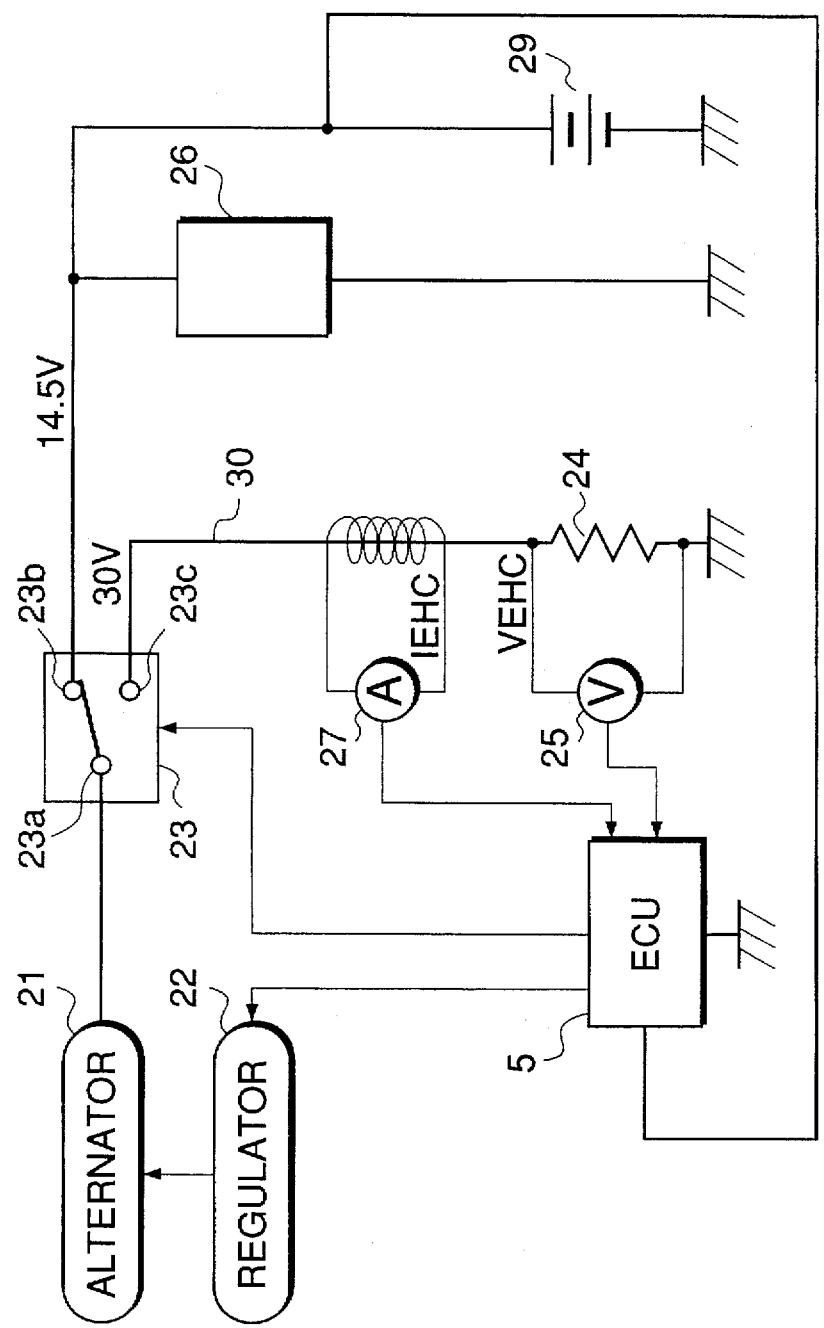
FIG. 2 is a circuit diagram showing the connection of a heater resistance of an electrically-heated catalyzer appearing in FIG. 1 and its related or peripheral circuit parts.

FIG. 2 shows a circuit formed by a heater resistance 24 of the EHC 16, etc., employed in the present embodiment. The EHC 16 also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded.

The changeover switch 23 has a further terminal 23b connected to a positive electrode of a battery 29 as well as to electrical equipment 26. The electrical equipment 26 are grounded. The battery 29 has its negative electrode grounded and its positive electrode connected to the ECU 5.

The switch 23 is electrically connected to the ECU 5 to have its switching operation controlled by a signal from the ECU 5. The switch 23 is normally in a position shown in FIG. 2 in which the terminals 23a and 23b of the switch 23 are connected to each other, and controlled to be changed in position from its illustrated position immediately after the start of the engine 1, if required. Further, a voltage sensor 25 for detecting EHC voltage VEHC across the heater resistance 24 is connected to both ends of the heater resistance 24. The voltage sensor 25 is electrically connected to the ECU 5, for supplying a signal indicative of the sensed voltage VEHC. Further, an electric current sensor 27 for detecting heater current IEHC supplied to the heater resistance 24 is provided on the connecting line 30 at a location upstream of the heater resistance 24. The electric current sensor 27 is electrically connected to the ECU 5, for supplying a signal indicative of the sensed electric current to the ECU 5.

Figure 3:
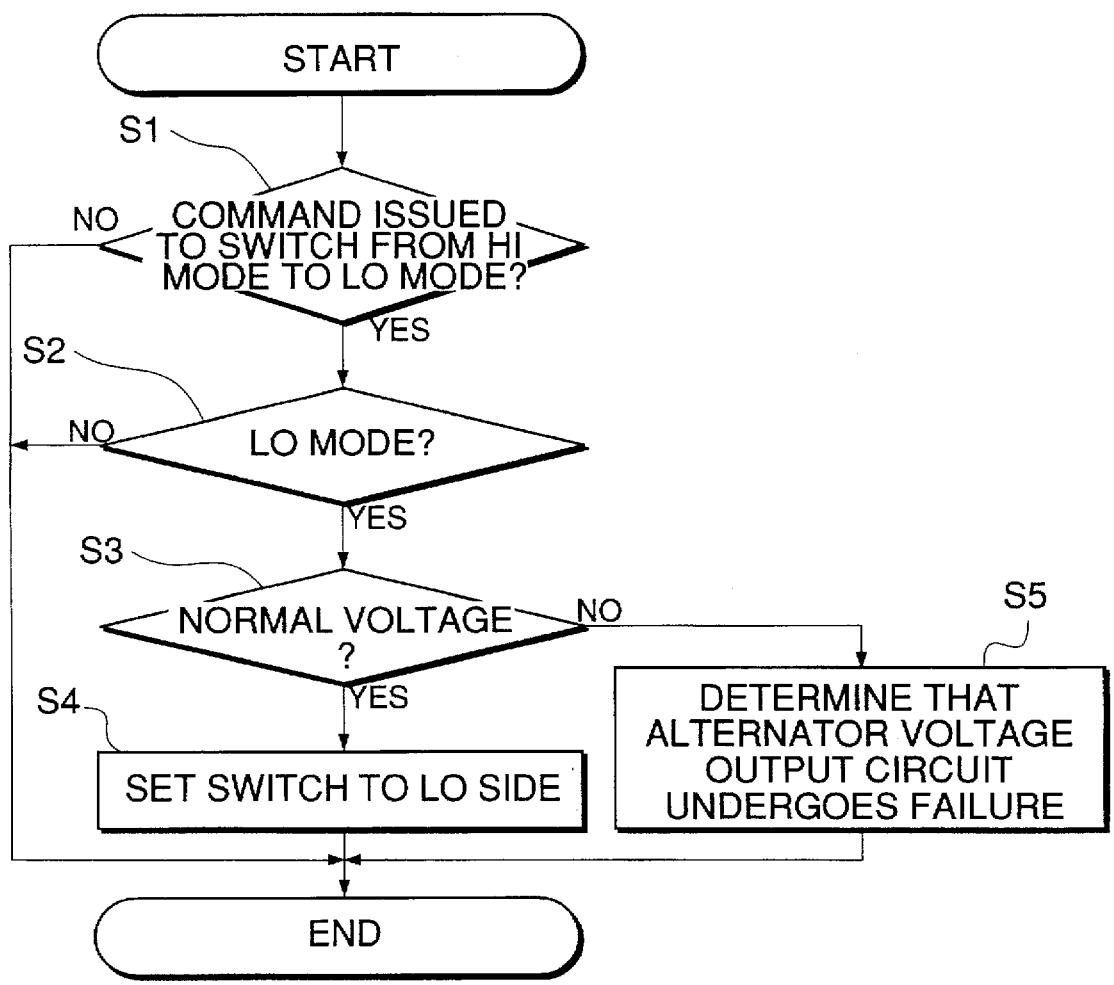
FIG. 3 is a flowchart showing a program for controlling output voltage from an alternator appearing in FIG. 1, according to the embodiment.

FIG. 3 shows a program for controlling voltage generated by the alternator 21, according to the embodiment. This program is executed at predetermined time intervals.

When the EHC 16 is operated, the alternator 21 has its control mode set to a high voltage-generating mode (30V), and the changeover switch 23 is switched to the terminal 23c side (EHC side). Accordingly, the heater 24 is supplied with high voltage (30V).

When energization of the EHC 16 is completed after a predetermined energization time period has elapsed, it is determined at a step S1 whether or not a command has been issued to change the control mode of the alternator 21 from the high voltage-generating (HI) mode in which high voltage (30 V) is to be supplied to the EHC 16, to a normal voltage-generating (LO) mode in which low voltage (14.5 V) is to be supplied to the electrical equipment 26. If the command has not been issued, the program is immediately terminated. On the other hand, if the command has been issued at the step S1, then it is determined at a step S2 whether or not the alternator 21 is in the LO mode. If the alternator 21 is not in the LO mode, the program is immediately terminated. On the other hand, if the alternator 21 is in the LO mode, the program proceeds to a step S3, wherein the ECU 5 detects the EHC voltage VEHC by means of the voltage sensor 25, to thereby determine whether or not the EHC voltage is equal to the normal voltage (14.5 V). If the answer is affirmative (YES), it is determined that the alternator 21 has been surely switched to the LO mode for generating the normal voltage (14.5 V), and then the changeover switch 23 is switched to the terminal 23b side (LO side) at a step S4.

On the other hand, if the EHC voltage VEHC is not equal to the normal voltage (14.5 V) at the step S3, the program proceeds to a step S5, wherein it is determined that a voltage output circuit (regulator 22, etc.) of the alternator 21 is at fault, to thereby inhibit the changeover switch from being switched to the terminal 23b side (LO side).

Thus, according to the embodiment, in the event that the voltage output circuit (regulator 22, etc.) of the alternator undergoes failure such that the alternator 21 continues to generate high voltage, the changeover switch 23 is inhibited from being switched, even when the destination of electric power generated by the alternator 21 is to be switched from the higher-voltage heater resistance 24 to the lower-voltage electrical equipment 26 out of a plurality of electric loads, to thereby prevent the electrical equipment 26 from being damaged due to supply of the high voltage.

Although in the above described embodiment, the EHC 16 is employed as the higher-voltage load, and the electrical equipment 26 as the lower-voltage load, out of a plurality of electric loads, this is not limitative. Alternatively, the invention may be applied to combinations of other electrical load devices having respective different load voltage value and employed as higher-voltage load and lower-voltage load, respectively.

What is claimed is:

1. A control system for controlling an alternator driven by an engine, for generating electric power, comprising:

a changeover switch for selectively switching destination of electric power, generated by said alternator, to a plurality of electric loads having respective different load voltage values; and control means for controlling switching operation of said changeover switch and for controlling voltage of said electric power generated by said alternator, according to a direction in which said changeover has been switched;

said control means including voltage-detecting means for detecting said voltage of said electric power, generated by said alternator, when said destination of electric power, generated by said alternator, is to be switched from a) a first electric load having a higher load voltage value of said plurality of electric loads to b) a second electric load having a lower load voltage value of said plurality of electric loads, and switching-enabling means for causing said changeover switch to switch said destination of said electric power, generated by said alternator, from said first electric load to said second electric load after said voltage-detecting means determines that said voltage of said electric power, generated by said alternators has been changed from said higher load voltage value to said lower load voltage value.

2. A control system as claimed in claim 1, wherein said control means includes abnormality-determining means for determining that said alternator is functioning abnormally, when said voltage of said electric power generated by said alternator maintains said predetermined higher voltage value when said destination of electric power generated by said alternator is to be switched from said first electric load to said second electric load.

3. A control system for controlling an alternator driven by an internal combustion engine, for generating electric power, said engine being installed in a vehicle having electrical equipment mounted on a chassis thereof, said engine having an exhaust system, and an electrically-heated catalyzer arranged in said exhaust system and connected to said alternator to be electrically heated by said electric power generated by said alternator, said electrical equipment having a lower load voltage value, and said electrically-heated catalyzer having a higher load voltage value, the control system comprising:

a changeover switch for selectively switching destination of electric power, generated by said alternator, to said electrically-heated catalyzer and said electrical equipment; and control means of controlling switching operation of said changeover switch and for controlling voltage of said electric power generated by said alternator, according to a direction in which said changeover switch has been switched;

said control means including voltage-detecting means for detecting said voltage of said electric power, generated by said alternator, when said destination of electric power, generated by said alternator, is to be switched from said electrically-heated catalyzer to said electrical equipment, and switching-enabling means for causing said changeover switch to switch said destination of said electric power, generated by said alternator, from said electrically-heated catalyzer to said electrical equipment after said voltage-detecting means determines that said voltage of said electric powers generated by said alternator, has been changed from said higher load voltage value to said lower load voltage value.

4. A control system as claimed in claim 3, wherein when said destination of said electric power generated by said alternator is switched to said electrically-heated catalyzer by said changeover switch, said control means controls said voltage of said electric power generated by said alternator to a value larger than a value assumed when said destination of said electric power generated by said alternator is switched to said electrical equipment by said changeover switch.

* * * * *